United States Patent [19]

Nash

[11] Patent Number: 4,856,804
[45] Date of Patent: Aug. 15, 1989

[54] SELF UNLOADING MULTIPLE TRAILER ARRANGEMENT

[75] Inventor: Boyd B. Nash, Yakima

[73] Assignee: Independent Trailer & Repair, Inc., Yakima, Wash.

[21] Appl. No.: 179,849

[22] Filed: Apr. 11, 1988

Related U.S. Application Data

[62] Division of Ser. No. 855,516, Apr. 23, 1986, Pat. No. 4,759,563.

[51] Int. Cl.⁴ ....................... B62D 53/06; B65G 67/32
[52] U.S. Cl. ..................................... 280/430; 280/441
[58] Field of Search ............... 280/423 A, 423 R, 426, 280/428, 430, 433, 438 R, 441, 442, 400, 403, 411 R, 412, 415 R, 415 B, 407, 408, 410, 460 R, 443, 445, 474

[56] References Cited

U.S. PATENT DOCUMENTS

| | | | |
|---|---|---|---|
| 3,170,716 | 2/1965 | Walther | 280/407 |
| 3,197,230 | 7/1965 | Raimbault | 280/445 |
| 3,252,714 | 5/1966 | Chieger | 280/418 |
| 3,722,914 | 3/1973 | Walther | 280/407 |
| 3,843,159 | 10/1974 | Hood | 280/407 |
| 3,995,876 | 12/1976 | Bonne | 280/423 A |
| 4,162,082 | 7/1979 | Curry | 280/423 A |
| 4,429,892 | 2/1984 | Frampton | 280/438 A |
| 4,443,025 | 4/1984 | Martin | 280/438 R |
| 4,573,699 | 3/1986 | Smith | 280/474 |
| 4,600,210 | 7/1986 | McMurray | 280/408 |

Primary Examiner—Charles A. Marmor
Attorney, Agent, or Firm—Eugene D. Farley

[57] ABSTRACT

In a trailer train combination having a tractor, lead trailer and one or two more following trailers, an adjustable dolly under the front end of each following trailer provides for close coupling of the multiple trailers in end to end contact. Then the multiple trailers are lifted to inclined position causing the upper trailer or trailers to discharge its flowable contents out through the lower trailer in a self unloading operation. The dolly has a slidable fifth wheel assembly and self steering ground wheels which may be locked in straight forward positions. A cab controlled electric and pneumatic control system controls these and other functions in the dolly. The trailers may be equipped with walking floors for self unloading in level positions.

7 Claims, 5 Drawing Sheets

SELF UNLOADING MULTIPLE TRAILER ARRANGEMENT

This is a division, of application Serial No. 06/855,516, filed 4/23/86, now U.S. Pat. No. 4,759,563.

BACKGROUND OF THE INVENTION

This invention relates to a multiple trailer arrangement for the self unloading of close coupled trailers, one through another.

The unloading of large highway trailers often takes considerable time that could be better utilized in hauling more material. This is especially true with multiple trailers which usually must be unhitched from each other and moved individually into unloading positions by the towing tractor.

SUMMARY OF THE INVENTION

The present arrangement makes it possible to upend multiple trailers in alignment with each other in abutting relation in inclined positions so as to cause flowable materials such as wood chips to discharge by gravity through the lower trailer. It is not necessary to uncouple the trailers from each other and it is not necessary to move the trailers individually into separate unloading locations nor to make a loaded trailer wait while another is being unloaded if there is only a single unloading station.

In the present arrangement, the door or doors on the upper end of the body of a lower trailer open inwardly and the door or doors on the lower end of an upper trailer open outwardly into the upper end of the lower trailer. A platform supporting both trailers in end to end contact with each other is raised to inclined position to perform the unloading operation. During this unloading operation the towing tractor is usually disconnected from the trailers and is sometimes available for other uses.

The close coupling of the trailers in end abutting relation also facilitates unloading in level positions such as drive through lift truck operations and the use of walking floors in the trailers, for other types of materials.

The above functions are made possible by an improved dolly having an adjustable fifth wheel under the front end of each trailer following the lead trailer. This dolly provides for adjustment of the trailers between close coupled and variably spaced positions relative to each other. When two trailers are spaced apart from each other the fifth wheel on the dolly provides a single articulating point, in addition to the articulating point at the fifth wheel on the tractor, to maintain steering control so that the combination of tractor and two trailers may be backed into a desired position.

The adjustable fifth wheel arrangement on the dolly may also be utilized to advantage in the tractor fifth wheel to transfer weight to the front steering axle and to close the space between the tractor cab and the trailer front for various reasons.

The invention will be better understood and additional features and advantages will become apparent from the following description of the preferred embodiments illustrated in the accompanying drawings. Various changes may be made in the details of construction and arrangement of parts and certain features may be used without others. All such modifications within the scope of the appended claims are included in the invention.

DESCRIPTION OF THE PREFERRED EMBODIMENTS

Figure 1:
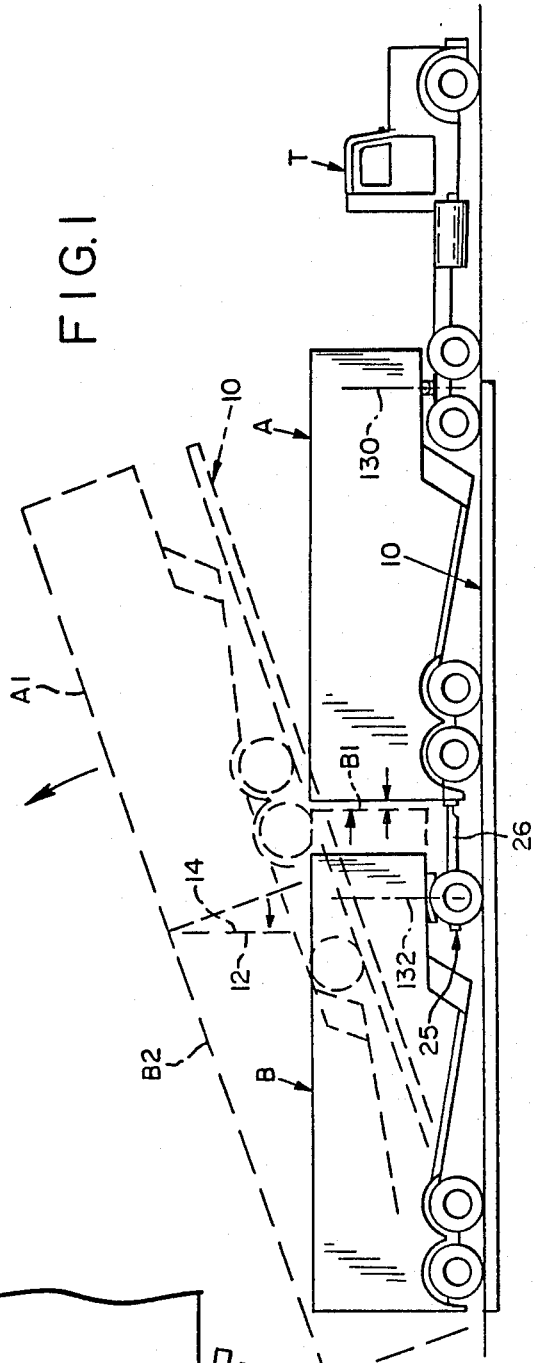
FIG. 1 is a side elevation view showing in solid lines two trailers spaced apart and showing in broken lines a close coupled relationship in horizontal position and an abutting relationship in inclined positions.

FIG. 1 shows in solid lines a conventional tractor trailer train arrangement wherein tractor T pulls lead trailer A which in turn pulls a dolly to which is attached a rear trailer B with the front end of trailer B spaced several feet behind the rear end of trailer A.

The present invention makes it possible to back up such a multiple trailer combination and to close couple the front end of trailer B in meeting relation to the rear end of trailer A. Then the tractor T is uncoupled and the two trailers may be raised by a platform or other suitable support 10 to inclined positions shown in broken lines at A1, B2 so that any loose free-flowing material in trailer A will flow out through trailer B whereby both trailers are self-unloaded in a single operation.

Figure 2:
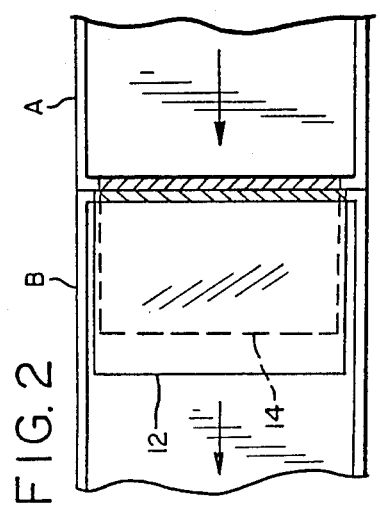
FIG. 2 is a top plan view with parts in section showing top hinged doors on the abutting ends of the lead and rear trailers.

Various arrangements of doors may be provided on the trailer bodies to make this flow through unloading operation possible. For example, the front end of lower trailer at B2 may have an end door 12 mounted on a horizontal hinge on its top edge which will swing inwardly by gravity as the material flows out of this trailer and the rear end of lead trailer A may have a similar top hinged rear end door 14 which may be unlatched to swing out under the door 12 as shown in FIGS. 1 and 2.

Figure 3:
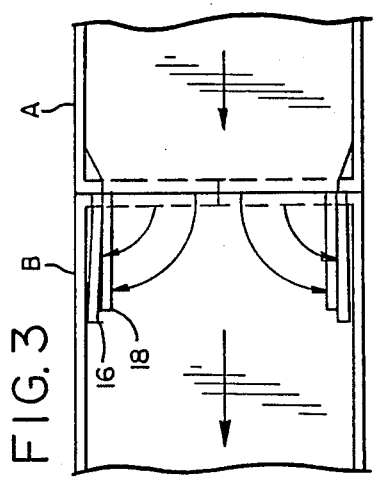
FIG. 3 is a top plan view showing a first arrangement of side hinged doors on the two trailers.

Alternatively, the trailers may have vertically hinged side doors arranged to swing into trailer B as shown in FIG. 3. Here the lower trailer's doors 16 swing back against the side walls of the body and the upper trailer doors 18 swing back against the doors 16.

Figure 4:
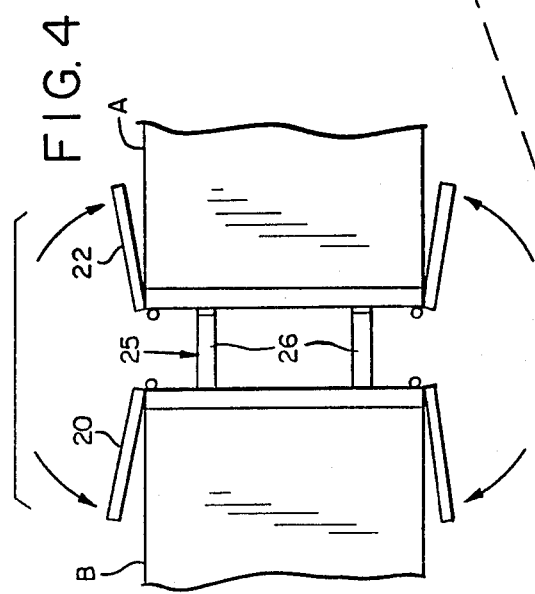
FIG. 4 is a top plan view showing a second arrangement of side hinged doors on the two trailers.

In FIG. 4 both trailers are provided with vertically hinged outward opening doors 20 and 22 which allow the adjacent ends of the trailer bodies to come together in meeting relation. This door arrangement is not suitable for inclined flow through self-unloading as shown in FIG. 1, but it does provide a passageway for a lift truck, for example, to drive through both trailers in level positions for both loading and unloading.

Figure 5:
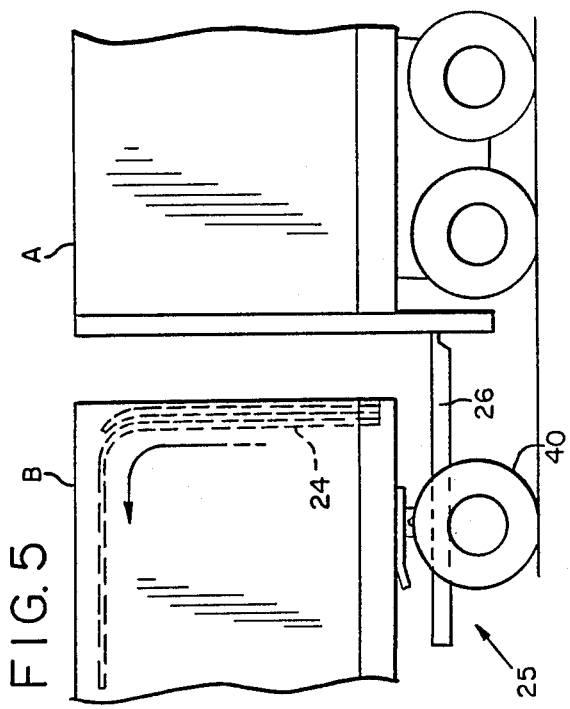
FIG. 5 is a side view of the two trailers showing a roll up type door on the front of the rear trailer.

In FIG. 5 the rear trailcer B is provided with a rollup type of flexible door 24. Lead trailer A may also be equipped with a similar rollup type of rear door or it may have doors of the type of previously described doors 14 or 18. If lead trailer A has doors like doors 22 it is not suitable for self-unloading as shown in FIG. 1 but it does allow drive through loading and unloading in level position as in FIG. 4.

The above described operations may also be carried out with a three trailer combination.

These operations are made possible by the adjustable dolly 25 shown in FIGS. 6–11. The frame of the dolly comprises a pair of parallel channel shaped drawbars 26 having apertured fittings 28 on their front ends for connection to the rear of front trailer A.

Figure 11:
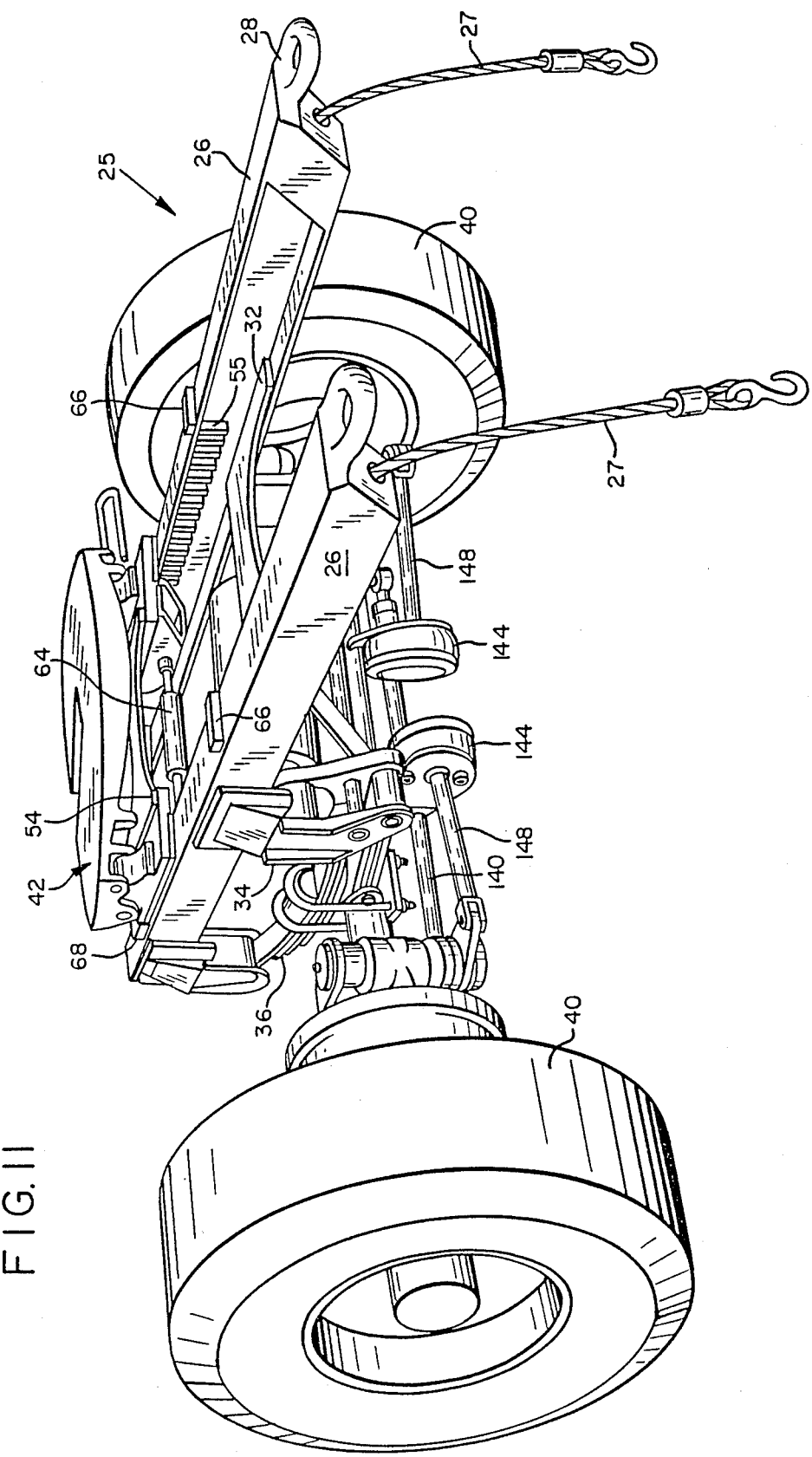
FIG. 11 is a perspective view of the dolly.

Cable connectors 27 in FIG. 11 provide a safety feature and are not normally functional. The rear ends of drawbars 26 are connected together by a cross member 30. Mid-length portions of the drawbars are interconnected by a narrow and resilient flat plate cross member 32 adjacent front suspension mounting bracket 34. Springs 36 support the frame 26 on an axle 38 having a pair of road wheels 40.

Figure 8:
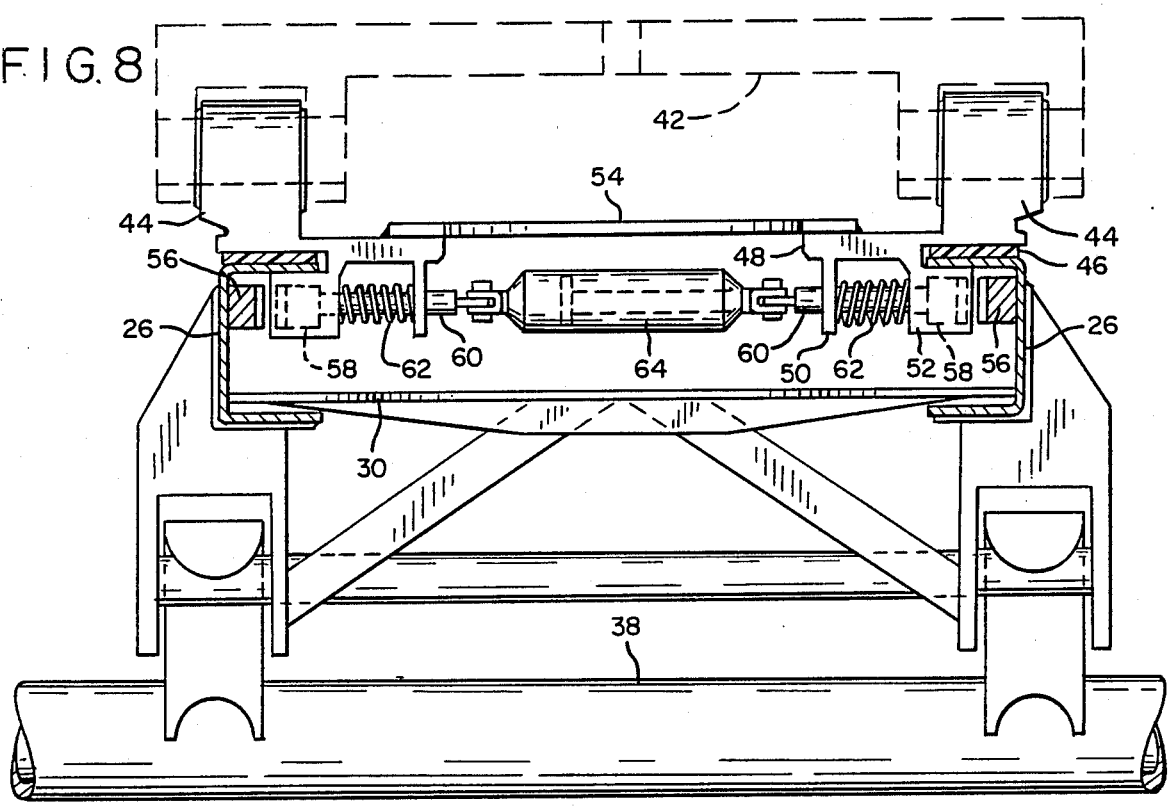
FIG. 8 is a view on the line 8—8 in FIG. 6.

A fifth wheel assembly 42 is mounted for sliding movement on the dolly frame 26. A pair of fifth wheel tower and lock guides 44 are equipped with low friction plastic pads 46 slidable on the top flanges of frame member 26 as shown in FIG. 8. Each part 44 is made as a one piece unitary casting having a horizontal flange 48 and vertical flange portions 50 and 52. The inwardly directed horizontal flanges 48 on opposite sides of the frame are interconnected by a slider plate 54. The components 44, 46, 48, 50, 52 and 54 form a carriage by which the fifth wheel is moved longitudinally along the dolly frame.

A toothed rack bar 56 is mounted inside each frame channel member 26, these racks being engageable by toothed dogs 58. Each dog 58 has a stub shaft 60 slidable in openings in the flanges 50, 52. The dogs 58 are pressed into engagement with rack bars 56 by springs 62 to lock the fifth wheel assembly 42 in adjusted position in the dolly frame 26. The dogs 58 may be retracted by air cylinder 64 to allow movement of the fifth wheel assembly along the frame 26. Forward movement of the fifth wheel assembly is unlimited except by frame length but may be additionally limited by stops 66 and rearward movement may be limited by stops 68 in FIG. 11.

Figure 6:
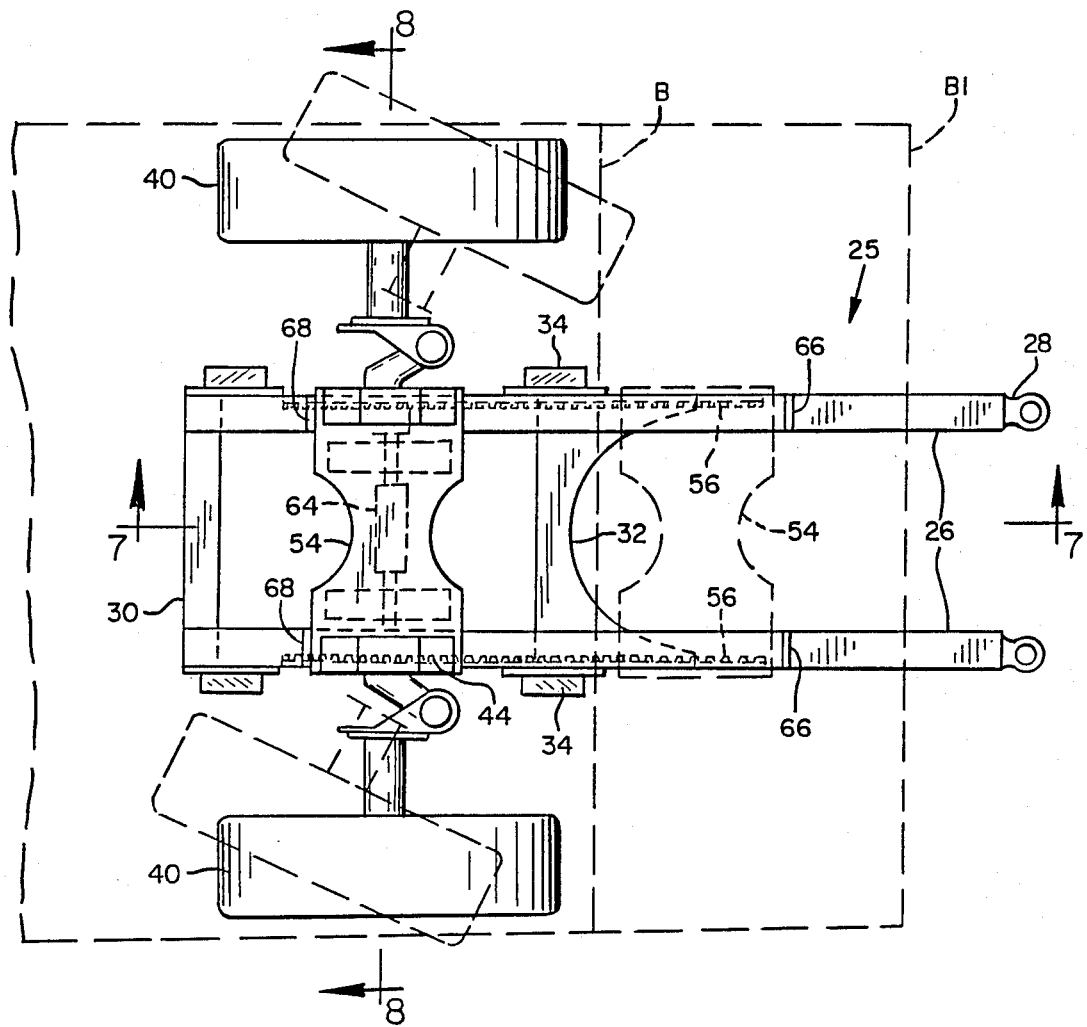
FIG. 6 is a top plan view of the adjustable dolly under the rear trailer in FIG. 1 showing in broken lines the range of movement of the rear trailer on the dolly.
Figure 7:
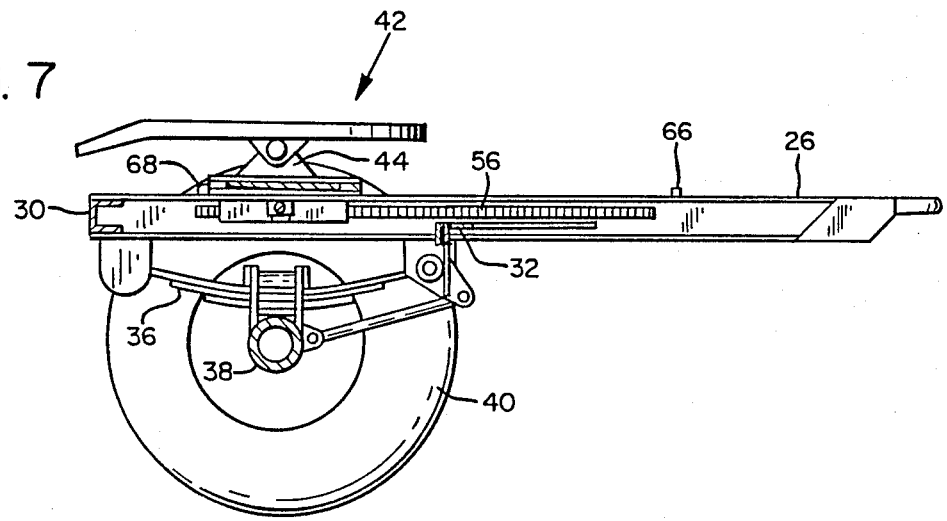
FIG. 7 is a view on the line 7—7 in FIG. 6.

In FIGS. 6 and 7 the fifth wheel assembly is in its rear position placing the front end of the trailer at B in FIGS. 1 and 6. A forward position of the fifth wheel, as indicated by the broken line position of slide plate 54 in FIG. 6, places the front end of the trailer at B1 in FIGS. 1 and 6.

Figure 12:
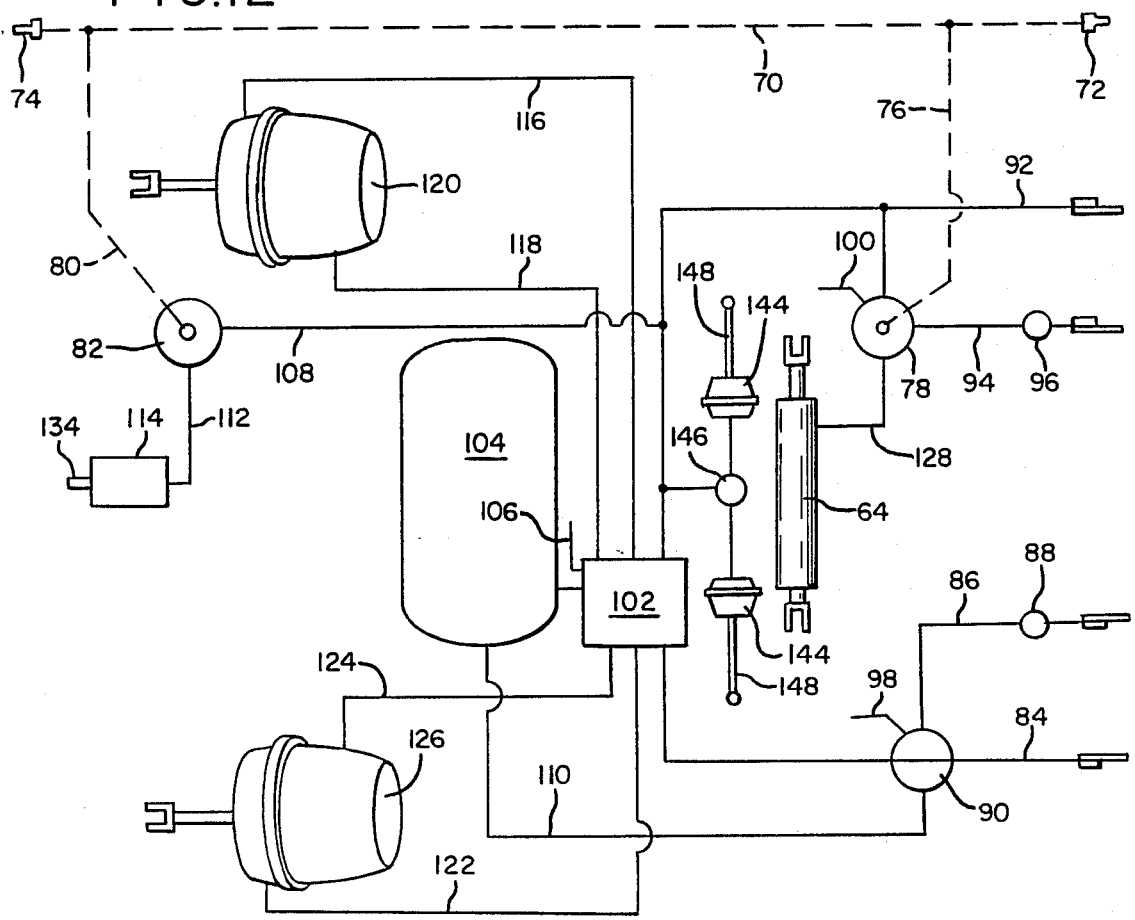
FIG. 12 is a schematic view of the electric and pneumatic control system for the dolly.

The electric and pneumatic control system is illustrated in FIG. 12. An electric cable 70 has a plug 72 connected to the back of lead trailer A and a plug 74 connected to rear trailer B. An electric wire 76 extends from cable 70 to cab controlled electric solenoid valve 78 and a wire 80 extends from cable 70 to electric solenoid valve 82. Valve 78 is a slider control valve and valve 82 is an axle lock valve.

Cable 70 also carries wires for tail lights, turn signals, etc. A service control air line 84 extends from the back of the front trailer, and a service control air line 86 having a manual shut off valve 88 leads from the front of the rear trailer, both to combination amplifier and quick release valve 90. An emergency air supply line 92 extends from the back of the front trailer and emergency air supply line 94 having a manual shut off valve 96 lead from the front of the rear trailer, both to solenoid valve 78 which controls slider cylinder 64. Valve 90 has an exhaust outlet 98 and valve 78 has an exhaust outlet 100.

Dual purpose relay valve 102 is connected to air tank 104 and has an exhaust outlet 106. The air tank is also connected through air line 110 to quick release valve 90. Solenoid valve 82 is connected through air line 112 to axle lock cylinder 114 and through air line 108 to air supply line 92.

Air lines 116 and 118 connect relay valve 102 with air brake application chamber 120 and air lines 122 and 124 connect this valve with air brake application chamber 126. Air line 128 connects solenoid valve 78 with slider cylinder 64.

The present form of construction provides numerous operational advantages. The slidable adjustment to the fifth wheel assembly 42, on dolly 25, allows the bodies of trailers A and B to be spaced several feet apart as shown in solid lines in FIG. 1, for turning corners and backing. In normal freeway travel this spacing may be reduced to several inches to reduce air turbulance and drag, as indicated by the broken line position of the rear trailer at B1 in FIG. 1.

For dumping the contents of one trailer through the other, the two trailers may be brought into abutting relationship with each other as shown in broken lines at A1, B2 in FIG. 1. As previously mentioned, this mutual engagement relation is also useful to provide drive through capability by vehicles such as lift trucks in loading or unloading non-flowable materials when the trailers are not raised to tilted positions. For some materials, the trailers may be of the flatbed type without the body structures shown in FIG. 1. Also, the trailers may be equipped with walking floors for moving the material.

An important feature is the limitation to two articulating points 130 and 132 in a two trailer train as shown in FIG. 1. A trailer train combination with more than two such articulating points will not back up. This feature in combination with the double drawbar dolly also provides increased stability in travel and greatly reduces the tendency to jackknife in emergency situations and on slippery roads.

The spacing of the trailers is adjusted by the operator in tractor T, through solenoid valve 78 in FIG. 12. By setting the brakes on the rear wheels of trailer B and retracting the dogs 58 from rack bars 56 in FIG. 8, by means of air cylinder 64, with the brakes released on dolley wheels 40, the operator may move the tractor and trailer A backward or forward to put dolley 25 in the desired position.

Then solenoid valve 78 is operated to release the air from cylinder 64 and allow springs 62 to re-engage dogs 58 with rack bars 56 and lock fifth wheel assembly 42 in the desired position. In this operation the brakes on dolly wheels 40 are controlled by air brake application chambers 120 and 126 in FIG. 12 through solenoid valve 78 and relay valve 102.

Dolly wheels 40 are normally self-steering as shown in FIG. 6. When desired, these wheels may be locked in straightforward positions by axle lock cylinder 114 under control of the operator in the tractor, through solenoid valve 82 in FIG. 12.

Figure 9:
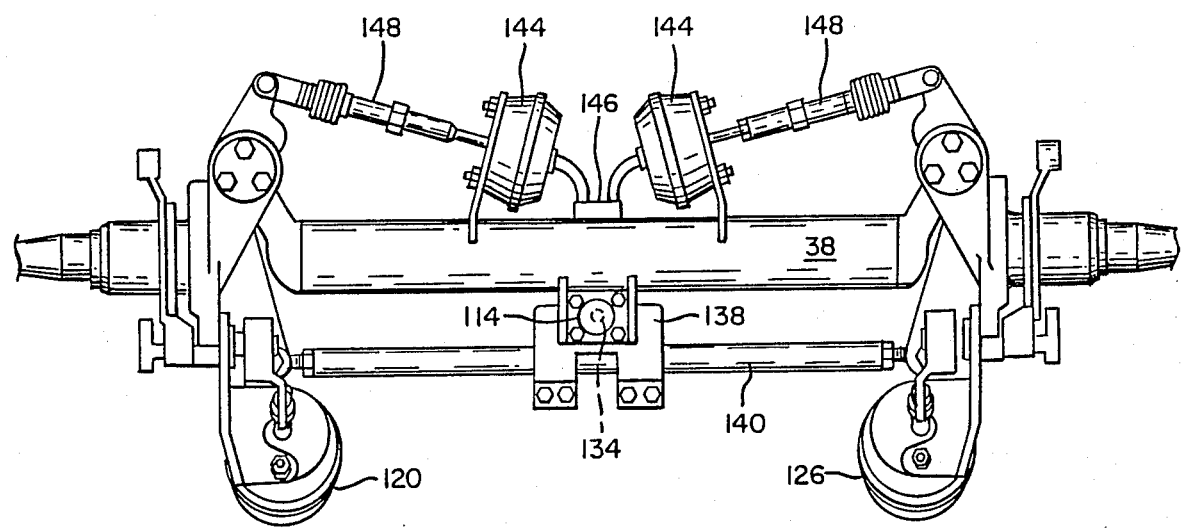
FIG. 9 is a top plan view of the steering lock and air damper system for self steering in the dolly.
Figure 10:
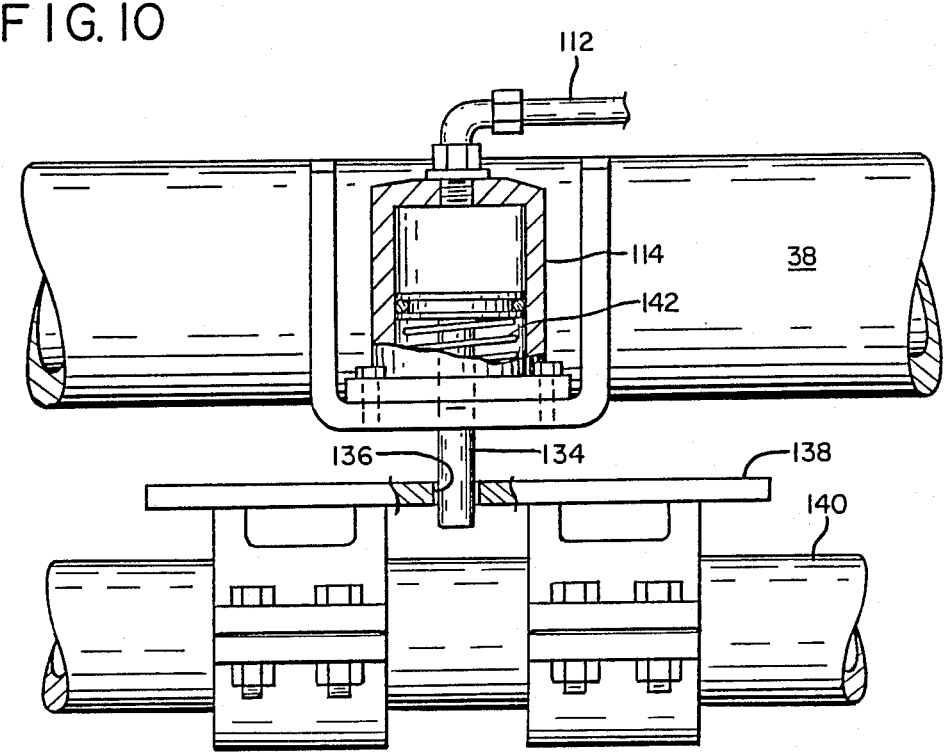
FIG. 10 is a rear elevation view of the steering lock with parts broken away.

As seen in FIGS. 9 and 10 a piston rod plunger 134 may be extended by air pressure in cylinder 114 to engage and lock in a hole 136 in steering lock plate 138 on steering tie rod 140 interconnecting the steering spindles of wheels 40. When air pressure is released in cylinder 114 the plunger 134 is retracted by spring 142.

A pair of steering dampers 144 in FIGS. 11 and 12 are provided to stabilize the dolly self steering system in chuck holes and other rough road conditions. These air dampers are connected with air pressure supply 92 through a manually adjustable regulator valve 146. As seen in FIGS. 9 and 11, diaphragms in the dampers are connected through tie rods 148 to lever arms on the steering spindles for wheels 40.

The adjustable fifth wheel assembly 42 is readily adaptable to the tractor. The conventional tractor has frame members similar to frame members 26 in the dolly in FIG. 8 whereby the fifth wheel tower and lock guides 44 may be mounted for sliding adjustment on the tractor frame and locked in adjusted position.

The walking floors for the trailers referred to herein are illustrated and described in U.S. Pat. Nos. 3,534,875; 4,143,760 and 4,144,963.

What is claimed is:

1. A dolly for detachably coupling front and rear trailers together for adjustment between a first position in which the confronting ends of the trailers are spaced apart and a second position in which the confronting ends of the trailers are in substantial abutment with each other, the dolly comprising:
    (a) an elongated frame having a front end portion including a pair of laterally spaced, substantially parallel, elongated, flexible drawbars and a rear end portion supported on laterally spaced wheels,
    (b) connector means on the front end of each drawbar for detachable coupling to the rear end of a front trailer,
    (c) coupling means configured for detachable coupling to the front end of a rear trailer, and
    (d) carriage means supporting the coupling means and mounted movably along the drawbars for adjusting the coupling means between a rearward position for spacing the confronting ends of front and rear trailers apart and a forward position for placing the confronting ends of front and rear trailers substantially in abutment with each other.

2. The dolly of claim 1 wherein said coupling means comprises a fifth wheel.

3. The dolly of claim 1 wherein said carriage means includes a pair of integral one-piece tower and lock guide units slidable on said drawbacks.

4. The dolly of claim 1 including latch means releasably interengaging the frame and carriage means for securing the coupling means releasably in said rearward and forward positions on the frame.

5. The dolly of claim 4 wherein said latch means comprises toothed rack bars on said drawbars, toothed dogs on said carriage means engageable with said rack bars to hold said coupling means in adjusted position, springs on said carriage mans pressing said dogs into engagement with said rack bars, and an air cylinder and piston on said carriage means arranged to retract said dogs.

6. The dolly of claim 1 wherein said drawbars are of channel shape with vertical web portions and upper and lower horizontal flanges, the coupling means comprises a fifth wheel, the carriage means includes a pair of integral one-piece fifth wheel tower and lock guide units slidable on the upper flanges of said drawbars, a transverse horizontal slider plate interconnecting said units, toothed rack bars mounted on the web portions of said drawbars, a pair of toothed dogs having transverse stub shafts slidable in openings in said units, a cylinder and piston connected between the ends of said stub shafts for retracting said dogs from said rack bars, and coil springs on said stub shafts within said units for pressing said dogs into engagement with said rack bars.

7. The dolly of claim 1 wherein the spaced wheels are mounted on the frame pivotally for self steering and are interconnected by a steering tie rod, a steering lock plate is secured to the tie rod and is provided with a locking aperture, the cylinder of a fluid pressure piston-cylinder unit is mounted on the frame and the piston of the unit is reciprocative in the cylinder, and a piston rod on the reciprocative piston is movable upon application of fluid pressure to the cylinder into and out of the locking aperture in the steering lock plate, for releasably locking the steering wheels in straight forward position.

* * * * *